March 12, 1940.     R. O. SHELDON     2,193,411
WAGON BOLSTER
Filed Aug. 7, 1939
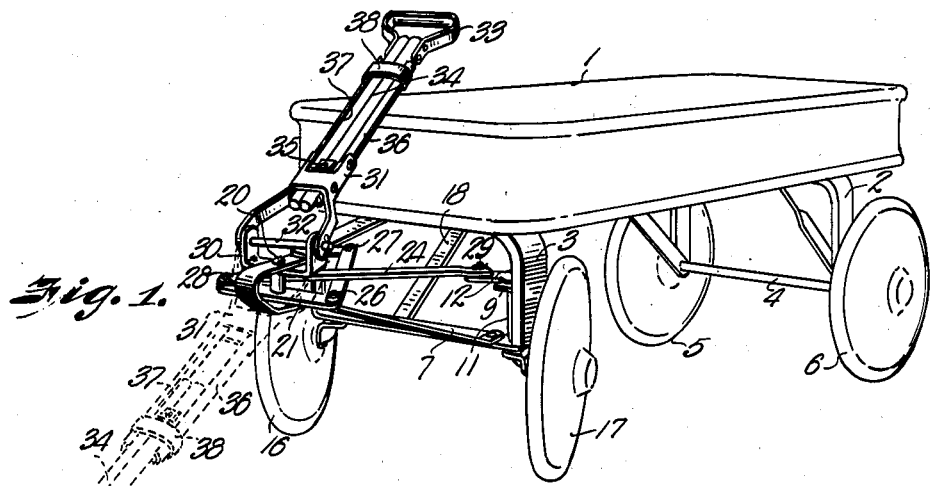
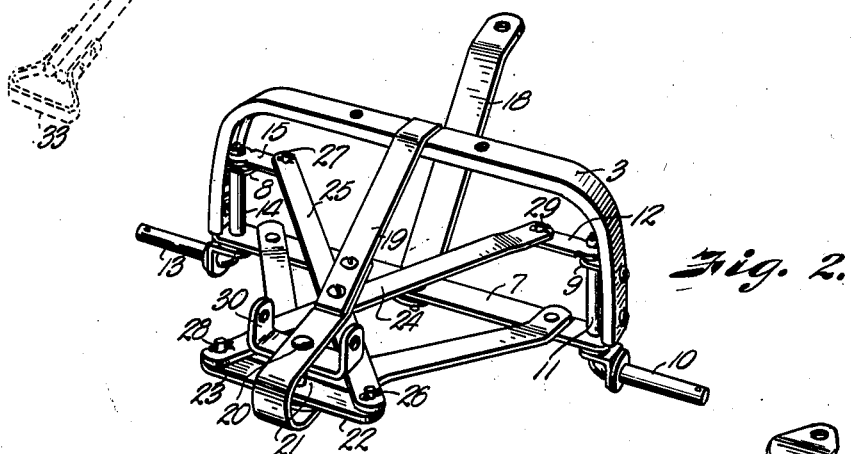
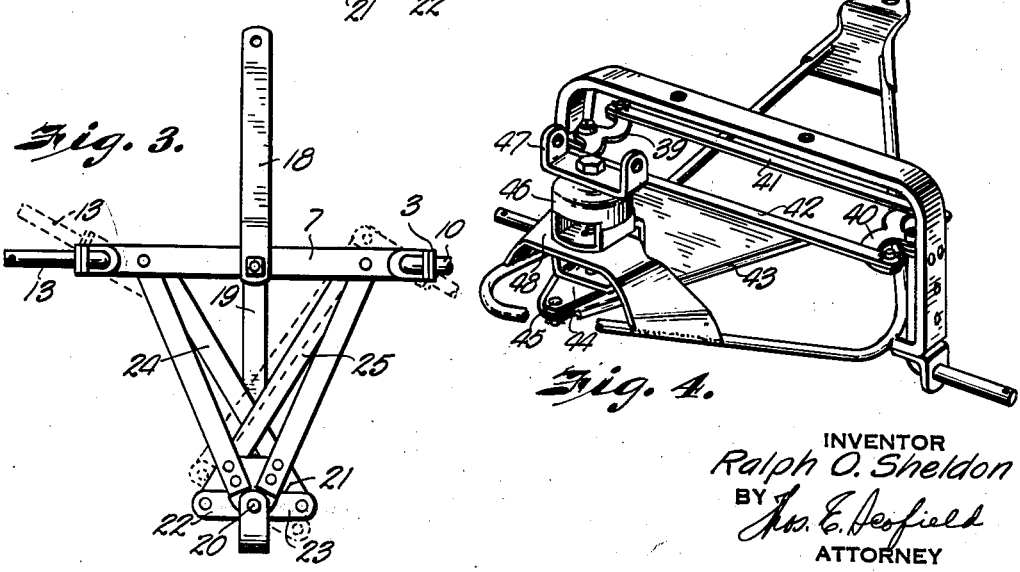
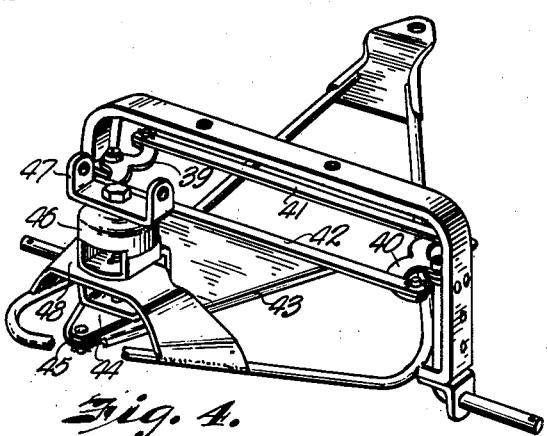
INVENTOR
Ralph O. Sheldon
BY
ATTORNEY Patented Mar. 12, 1940

2,193,411

UNITED STATES PATENT OFFICE 2,193,411

WAGON BOLSTER

Ralph O. Sheldon, Kansas City, Mo., assignor to Francis E. Peek and Samuel E. Peek, Wichita, Kans.

Application August 7, 1939, Serial No. 288,753

2 Claims. (Cl. 280—87.01)

My invention relates to wagon bolsters and more particularly to wagon bolsters for coaster wagons used by children.

In the old style wagons, the front wheels were attached to an axle which was pivoted by a single king pin. In making short turns in wagons of this construction, the wheels were pivoted from beneath the wagon, resulting in spills and frequently in serious injury to children.

It has been suggested to use individual pivoted front wheels such as are used in automotive vehicles for coaster wagons. The constructions of the prior art, however, have had the disadvantage of being difficult to operate.

I have discovered that the cause of the difficulty in the prior art has been occasioned largely by the fact that the linkages extended at an angle so that, when the steering moment was applied, a moment of force, tending to move the linkages out of a horizontal plane was set up. This moment tended to bind the pivots, making steering difficult.

One object of my invention is to provide a coaster wagon which will steer with ease.

Another object of my invention is to provide a simple and rugged construction for steering a coaster wagon.

Another object of my invention is to provide a coaster wagon provided with a telescoping tongue, which can be used for either pulling or coasting.

Other and further objects of my invention will appear from the following description.

In the accompanying drawing which forms part of the instant specification and is to be read in conjunction therewith and in which like parts are indicated by like reference numerals in the various views;

Figure 1 is a perspective view of a coaster wagon showing one embodiment of my invention.

Figure 2 is a perspective view of the bolster and steering arrangement shown in Figure 1.

Figure 3 is a bottom plan view of the bolster and steering arrangement shown in Figure 2.

Figure 4 is a perspective view of another embodiment of a bolster and steering arrangement according to my invention.

In general, my invention contemplates the provision of a wagon having a bolster and a tongue supporting member secured to the bolster and extending forwardly thereof. Separate wheel axles are pivotally mounted in said bolster supported for rotation around a vertical axis. The axle rotating means comprises a pair of lever arms which are connected by links to a steering yoke which is, in turn, pivoted in the tongue supporting member. The links connecting the actuating arms and the steering yoke lie substantially in a horizontal plane so that no moments tending to move the links out of the plane are set up during the steering action. The positioning of the linkage in a horizontal plane avoids these moments and accomplishes one of the objects of my invention.

More particularly, referring now to the drawings, a wagon body 1 is mounted upon a rear bolster 2 and a front bolster 3. The bolsters are rigidly secured to the wagon body in any suitable manner. The rear bolster carries an axle 4 to which rear wheels 5 and 6 are secured. The front bolster 3 is provided with a strap 7 and a pair of lugs 8 and 9. An axle 10 is formed from a rod which is bent in the form of a right angle, the projecting arm 11 being pivoted in the strap 7 and the lug 9, and forming a rotating spindle. An arm 12 is rigidly secured to the spindle 11. An axle 13 is similarly provided with a spindle 14 which is pivoted in the strap 7 and the lug 8. To the spindle 14 is secured a steering arm 15. The front wheels 16 and 17 are pivoted around axles 13 and 10. A rearwardly projecting brace 18 is adapted to be secured to the body member to brace the bolster 3. Projecting forwardly from the bolster 3 is a tongue supporting member 19. Pivotally mounted in the tongue supporting member, around pivot pin 20, is a steering yoke 21. The steering yoke is formed with two arms 22 and 23. Arms 22 and 23 are equal in length to each other and to each of the arms 12 and 15. A pair of links 24 and 25 interconnect the arms 12 and 23, and 15 and 22, as can readily be seen by reference to Figure 2. Pivot pins 26 and 27 pivotally secure the ends of link 25 to arms 22 and 15, while pivot pins 28 and 29 pivotally secure the ends of link 24 to arms 12 and 23. The pivoting points are substantially in a horizontal plane. The yoke 21 is rigidly secured to the pivot pin 20. To this pin is also secured an upper yoke 30, to which the tongue 31 is adapted to be pivotally secured by means of pin 32, as can readily be seen by reference to Figure 1. The tongue is formed with a telescopic construction and comprises a handle member 33 secured to an upper telescoping member 34. A stop 35 is secured to the member 34. The lower telescoping member 36 is provided with a cutaway portion 37 for the free movement of the stop 35. In the coasting position, the tongue is telescoped to the full line position in Figure 1 with the stop 35 against the bottom of the cutaway portion 37.

In extended position, the stop 35 is against the upper member 39 of the cutaway portion, as shown in the dotted line position in Figure 1.

The links 24 and 25 in Figure 2 are crossed so that movement of the steering tongue will be in alignment with the direction in which the wagon is to go. The operation of the linkage is clearly shown in Figure 3. It will be observed that the arrangement is substantially a parallel motion linkage in which the axles 10 and 13 are constrained to move to a position parallel to the yoke 21. It is believed that the operation of the modification shown in Figures 1, 2, and 3 will be clear from the foregoing description.

In the embodiment shown in Figure 4 the construction of the pivoted axles is the same as that shown in Figure 2. The steering arms 12 and 13 are replaced by steering yokes 39 and 40, which are interconnected by cross arms 41 and 42 to give a parallel motion. A plate 43 is secured to the arm 41. This plate is pivotally secured to a steering arm 44 by means of pivot pin 45. The steering arm 44 is rigidly secured to a pivoted member 46 to which the tongue receiving member 47 is secured, the pivoted member being adapted to pivot upon the tongue supporting member 48. Rotation of the steering arm 44 by means of the tongue will move the plate 43. Since the plate 43 is rigidly secured to the arm 42, steering will be effected by the parallel motion arrangement. It will be observed that, in this embodiment, as in the previously described embodiment, all of the pivot points lie in substantially the same horizontal plane.

In the embodiment shown in Figure 4, it will be noted that the pivot points for the parallel steering motion lie in substantially the same horizontal plane, thus obviating the moment at right angles to the pivots, which was present in the constructions of the prior art.

It will be seen that I have accomplished the objects of my invention. I have provided a steering control which will maintain the wheels under the coaster wagon preventing spills resulting in injuries to children. The arrangement is such that the steering takes place with a minimum of effort. The lever arm of the tongue readily turns the steering yoke which, in turn, pivots the wheels in a positive and expeditious manner.

It will be understood that certain features and subcombinations are of utility and may be employed without reference to other features and sub-combinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, I claim:

1. A wagon comprising in combination a bolster, a tongue supporting member secured to and extending forwardly of the bolster, separate wheel axles pivotally mounted on said bolster for movement around vertical axes, a yoke pivoted on the tongue supporting member, a linkage for rotating said axles including lever arms extending substantially parallel with the axle and crossed connecting means between said lever arms and said yoke, said linkage positioned in substantially a horizontal plane, and a tongue for actuating the yoke.

2. A wagon comprising in combination a bolster, a tongue supporting member secured to and extending forwardly of said bolster, separate wheel axles, means for pivotally mounting said wheel axles on said bolsters for movement around vertical axes, a yoke pivoted on said tongue supporting member, arms extending substantially parallel with the axle for rotating said axles, crossed links pivotally interconnecting said arms and said yoke, said pivot connections lying substantially in a horizontal plane, and a tongue for actuating said yoke.

RALPH O. SHELDON.